United States Patent
Ishizuki et al.

(10) Patent No.: US 9,846,447 B2
(45) Date of Patent: Dec. 19, 2017

(54) HOLLOW OPERATING LEVER AND METHOD FOR MANUFACTURING SAME

(71) Applicant: Yorozu Corporation, Kanagawa (JP)

(72) Inventors: Masaharu Ishizuki, Kanagawa (JP); Yutaka Kuroi, Kanagawa (JP); Masaki Ueno, Kanagawa (JP)

(73) Assignee: YOROZU CORPORATION, Kanagawa (JP)

( * ) Notice: Subject to any disclaimer, the term of this patent is extended or adjusted under 35 U.S.C. 154(b) by 150 days.

(21) Appl. No.: 14/761,701

(22) PCT Filed: Jan. 18, 2013

(86) PCT No.: PCT/JP2013/050967
§ 371 (c)(1),
(2) Date: Jul. 17, 2015

(87) PCT Pub. No.: WO2014/112105
PCT Pub. Date: Jul. 24, 2014

(65) Prior Publication Data
US 2015/0355670 A1    Dec. 10, 2015

(51) Int. Cl.
*G05G 1/04* (2006.01)
*G05G 1/50* (2008.04)
(Continued)

(52) U.S. Cl.
CPC ............. *G05G 1/50* (2013.01); *B60T 7/06* (2013.01); *G05G 1/04* (2013.01); *G05G 1/44* (2013.01);
(Continued)

(58) Field of Classification Search
CPC .. G05G 1/04; G05G 1/30; G05G 1/44; G05G 1/50; Y10T 74/20888; Y10T 29/49865; B60T 7/06
See application file for complete search history.

(56) References Cited

U.S. PATENT DOCUMENTS

| | | | | |
|---|---|---|---|---|
| 3,744,340 A | * | 7/1973 | Peterson | ................... B60T 7/06 |
| | | | | 74/560 |
| 6,513,407 B1 | * | 2/2003 | Higgins | ................... G05G 1/30 |
| | | | | 74/560 |

(Continued)

FOREIGN PATENT DOCUMENTS

| | | |
|---|---|---|
| FR | 2821684 A1 | 9/2002 |
| JP | 09-155446 | 6/1997 |

(Continued)

OTHER PUBLICATIONS

International Search Report PCT/JP2013/050967.
Written Opinion of the International Searching Authority, PCT/JP2013/050967.

*Primary Examiner* — Thomas C Diaz
(74) *Attorney, Agent, or Firm* — Nixon Peabody LLP; Eduardo J. Quinones

(57) ABSTRACT

[Problem] To provide a hollow operating lever that is easily manufactured with good operability.
[Solution] A hollow operating lever (4), which is formed in such a manner that end portions (W1 and W2) of a flat plate-shaped workpiece (W) are joined to each other at a joint (31) and thus is rotatably provided with respect to a support shaft (3), is characterized by including: a first wall (10) that is an operation surface side on which rotational force (F) acts to rotate; a pair of second walls (20) that are provided with coaxial holes (21) through which the support shaft is inserted, and are bent continuously to both ends of the first wall; and a third wall (30) that is provided to face the first wall (10) and is configured to connect the pair of second walls to each other through the joint.

3 Claims, 10 Drawing Sheets

(51) Int. Cl.
  *B60T 7/06* (2006.01)
  *G05G 1/44* (2008.04)
(52) U.S. Cl.
  CPC .... *Y10T 29/49865* (2015.01); *Y10T 74/20888* (2015.01)

(56) References Cited

U.S. PATENT DOCUMENTS

| | | | |
|---|---|---|---|
| 9,003,920 B2* | 4/2015 | Nagahori | B21D 53/88 74/512 |
| 2010/0058887 A1 | 3/2010 | Fujita et al. | |
| 2014/0069227 A1* | 3/2014 | Kawaguchi | B21J 5/063 74/560 |

FOREIGN PATENT DOCUMENTS

| | | | |
|---|---|---|---|
| JP | 2010247757 A | 11/2010 | |
| WO | WO-2008120586 A1 | 10/2008 | |
| WO | WO-2012124735 A1 | 9/2012 | |

* cited by examiner

HOLLOW OPERATING LEVER AND METHOD FOR MANUFACTURING SAME

CROSS REFERENCE TO RELATED APPLICATIONS

This application is a national stage application (under 35 U.S.C. §371) of PCT/JP2013/050967, filed Jan. 18, 2013, the contents of which are incorporated herein by reference in its entirety.

TECHNICAL FIELD

The present invention relates to a hollow operating lever and a method of manufacturing the same.

BACKGROUND ART

An example of method of manufacturing a bent hollow operating lever for a vehicle such as a brake pedal for a vehicle includes the manufacturing method described in Patent Literature 1. In this method, a pair of half-split members connected to each other through a connection portion is pressed by bending of connection portion, and both flange portions provided on the half-split member come in contact with each other and are coupled to each other by hemming working. According to this method, since both flange portions can be coupled to each other without welding, it is possible to manufacture a brake pedal for vehicle not having welded portions.

CITATION LIST

Patent Literature

Patent Literature 1: JP-2010-247757 A

SUMMARY OF INVENTION

Technical Problem

However, an arm part for vehicle manufactured by the manufacturing method disclosed in Patent Literature 1 has a joint at which both flange portions are coupled to each other, on an operation surface on which rotational force acts to rotate, the joint being on a rear side of the vehicle, so that there is a possibility that operability is impaired by the joint. Thus, it is necessary to cover the joint with a cover member or to additionally machine the joint to the extent that the operability is not impaired, manufacturing costs increase, and manufacturing steps are complicated. In addition, by the joint arrangement on the side of the vehicle, an arrangement in which there is no projection on the rear side of the vehicle may be achieved. In the case of this arrangement, however, there is a possibility that operability is impaired during retreading, which is not appropriate.

The present invention has been made to solve the problem associated with the above conventional techniques, and an object thereof is to provide a hollow operating lever that can be easily manufactured with good operability and a method of manufacturing the same.

Means for Solving Problem

The above object is achieved by the inventions described in (1) to (7) below.

(1) A hollow operating lever that is formed in such a manner that end portions of a flat plate-shaped workpiece are joined to each other at a joint and thus is rotatable with respect to a support shaft, includes:

a first wall that is an operation surface side on which rotational force acts to rotate;

a pair of second walls that are provided with coaxial holes, through which the support shaft is inserted, and are bent continuously to both ends of the first wall; and a third wall that is provided to face the first wall and is configured to connect the pair of second walls to each other through the joint.

(2) The hollow operating lever according to (1) further includes: a ridge portion that is provided to extend in a direction intersecting the support shaft of the first wall and swells along a direction from the third wall to the first wall.

(3) In the hollow operating lever according to (1) or (2), the end portions are joined to each other at the joint by hemming junction or welding junction.

(4) In the hollow operating lever according to any one of (1) to (3), the lever is used in a brake pedal.

(5) A method of manufacturing a hollow operating lever that is formed in such a manner that a flat plate-shaped workpiece extending in a first plane formed by a first direction and a second direction orthogonal to the first direction is subjected to the press working in a stepwise manner using a plurality of forming dies and is manufactured to be rotatable with respect to a support shaft, includes:

an extrusion step of: on the workpiece in a second plane formed by the first direction and a third direction, forming an extrusion portion that extrudes along the third direction and also stretches in the second direction; and forming extension portions that are connected to both end portions of the extrusion portion and extend in a direction opposite to an extruding direction of the extrusion portion and flange portions that are connected to both end portions opposite to the end portions of the extension portions connected to the extrusion portion and extend away from each other in the first direction;

a protrusion step of: in the second plane, forming a protrusion portion which protrudes in the direction opposite to the extruding direction of the extrusion portion in the vicinity of the center of the extrusion portion; and curving the extrusion portion, the extension portion, and the flange portion in the direction opposite to the extruding direction of the extrusion portion, based on a connection portion, which connects the protrusion portion and the extrusion portion to each other, while maintaining curvature between the extrusion portion and the extension portion and curvature between the extension portion and the flange portion;

a rough forming step of: in the second plane, further curving the extrusion portion, the extension portion, and the flange portion in the direction opposite to the extruding direction of the extrusion portion based on the connection portion, by pressing of the protrusion portion in the extruding direction of the extrusion portion, while maintaining curvature between the protrusion portion and the extrusion portion, curvature between the extrusion portion and the extension portion, and curvature between the extension portion and the flange portion;

a contacting step of: in the second plane, curving the extrusion portion to be substantially parallel with the extruding direction of the extrusion portion, while maintaining the curvature between the extrusion portion and the extension portion and the curvature between the extension portion and the flange portion, thereby contacting the flange portions with each other;

a joining step of joining the flange portions to each other; and a hole forming step of coaxially forming the holes through which the support shaft is inserted on both sides of the extrusion portion.

(6) The method of manufacturing the hollow operating lever according to (5) further includes: a swelling step of; in the second plane, swelling the protrusion portion in the extruding direction of the extrusion portion to form a ridge portion and bring the flange portions close to each other, between the rough forming step and the contacting step.

(7) In the method of manufacturing the hollow operating lever according to (5) or (6), the flange portions are joined to each other by hemming junction or welding junction in the joining step.

Advantageous Effect of the Invention

According to the invention described in the above (1), since the first wall is the operation surface side on which the rotational force acts, there is no joint on the operation surface, and it is possible to provide the hollow operation lever with good operability.

According to the invention described in the above (2), since the hollow operating lever includes the ridge portion that extends in the direction intersecting the support shaft of the first wall and swells along the direction from the third wall to the first wall, strength against the rotational force is improved.

According to the invention described in the above (3), since the end portions are joined to each other at the joint by hemming junction or welding junction, the end portions of the workpiece can be easily and reliably joined to each other.

According to the invention described in the above (4), since the hollow operating lever described in the above (1) to (3) is used in the brake pedal, there is no joint on the operation surface of the brake pedal, and it is possible to provide the brake pedal with good operability.

According to the invention described in the above (5), by the protrusion portion serving as the operation surface side on which the rotational force acts, since there is no joint on the operation surface, it is possible to provide the method of manufacturing the hollow operating lever that can be easily manufactured with good operability.

According to the invention described in the above (6), since the ridge portion is formed on the protrusion portion, the strength against the rotational force is improved.

According to the invention described in the above (7), since the flange portions are joined to each other by the hemming junction or the welding junction in the joining step, the flange portions of the workpiece can be easily joined to each other.

DESCRIPTION OF EMBODIMENTS

An embodiment of the present invention will be explained with reference to drawings. In the present embodiment, a plane in which a flat plate is arranged is defined as an XY plane (first plane), a direction in which the flat plate stretches and which is orthogonal to the X direction (first direction) is defined as a Y direction (second direction), and a direction orthogonal to the XY plane is defined as a Z direction (third direction).

Figure 1:
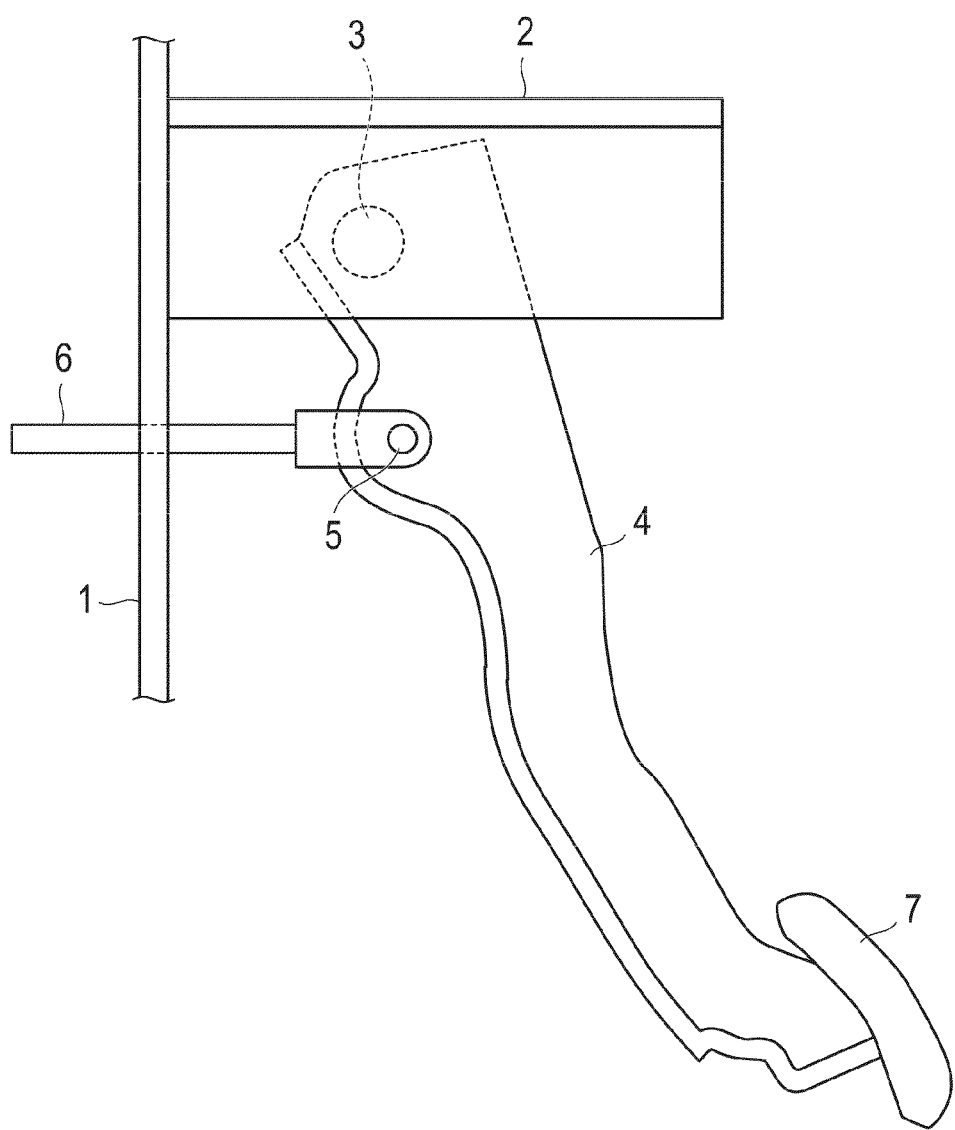
FIG. 1 is a side view schematically illustrating an example of a brake pedal unit according to an embodiment of the present invention.

As a hollow operating lever according to the present embodiment, for example, there is a brake pedal for use in a brake pedal unit. As generally illustrated in FIG. 1, the brake pedal unit includes: a bracket 2 that is attached to a dash panel 1; a brake pedal 4 that is rotatably mounted on a support shaft 3 provided on the bracket 2; a pin 5 that penetrates through an upper portion of the brake pedal 4; a rod 6 that has one end connected to the pin 5 and the other end connected to a master back (not illustrated); and a footboard 7 that is attached to a lower portion of the brake pedal 4.

Figure 2:
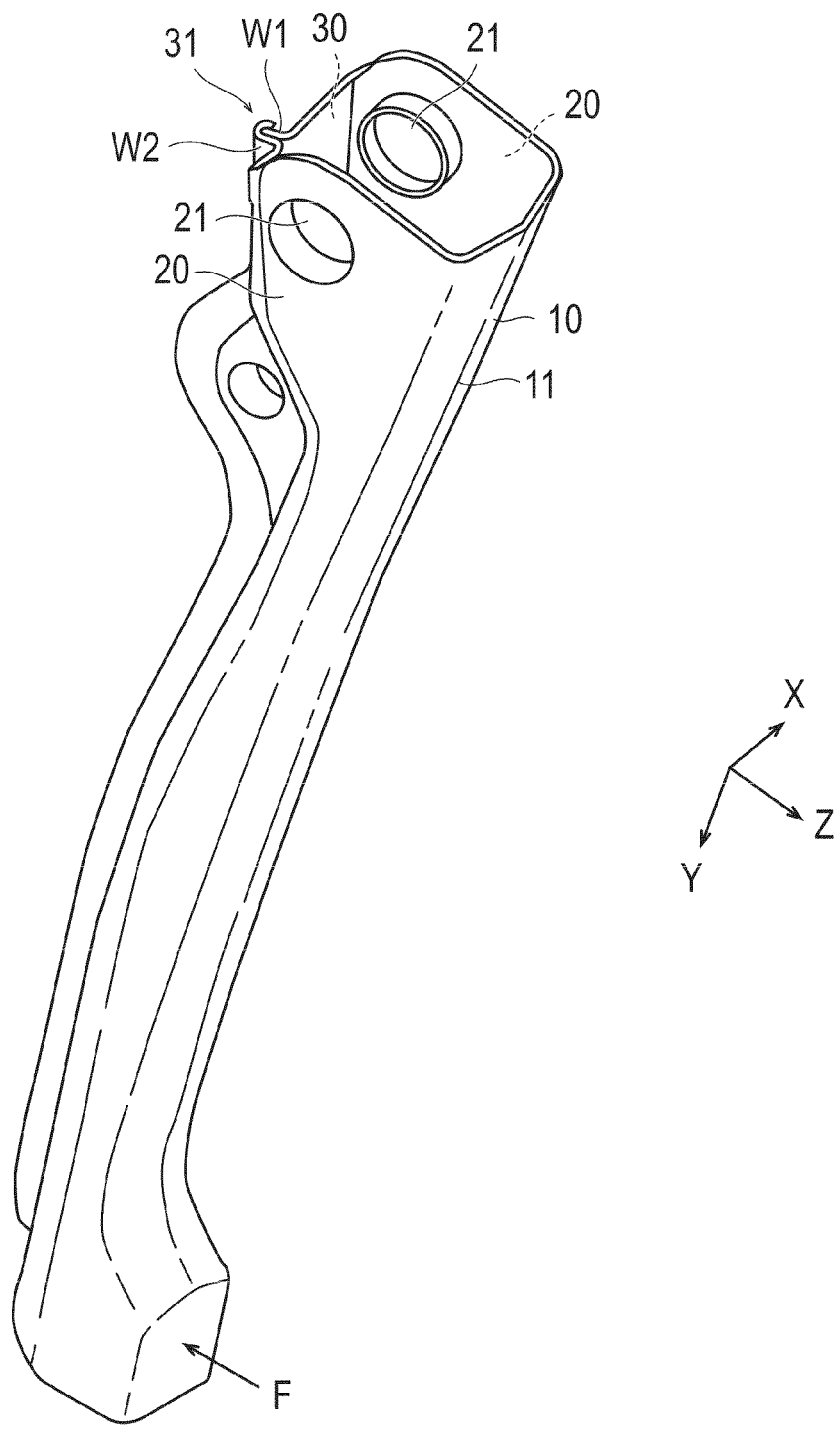
FIG. 2 is a perspective view illustrating a brake pedal according to the embodiment.

As illustrated in FIG. 2, the brake pedal 4 is formed in such a manner that end portions W1 and W2 of a flat plate-shaped workpiece W are joined to each other at a joint 31 and thus is rotatably provided with respect to the support shaft 3.

In addition, the brake pedal 4 includes: a first wall 10 that is an operation surface side on which rotational force F acts to rotate; a pair of second walls 20 that are provided with coaxial holes 21 through which the support shaft 3 is inserted, and are bent continuously to both ends of the first wall 10; and a third wall 30 that is provided to face the first wall 10 and is configured to connect the pair of second walls 20 to each other through the joint 31.

The brake pedal 4 further includes a ridge portion 11 that is provided to extend in a direction (Y direction) intersecting the support shaft 3 of the first wall 10 and swells along a direction from the third wall 30 to the first wall 10.

In addition, the end portions W1 and W2 are joined to each other by a hemming junction manner at the joint 31.

A method of manufacturing the hollow operating lever according to the present embodiment will be described below. As an example of the hollow operating lever, a method of manufacturing the brake pedal 4 will be described herein. As described in brief, the flat plate-shaped workpiece W extending in the XY plane formed by the X direction and the Y direction orthogonal to the X direction is subjected to press working in a stepwise manner using a plurality of forming dies, and thus the brake pedal 4 is formed. The detailed description will be described below.

Figure 3:
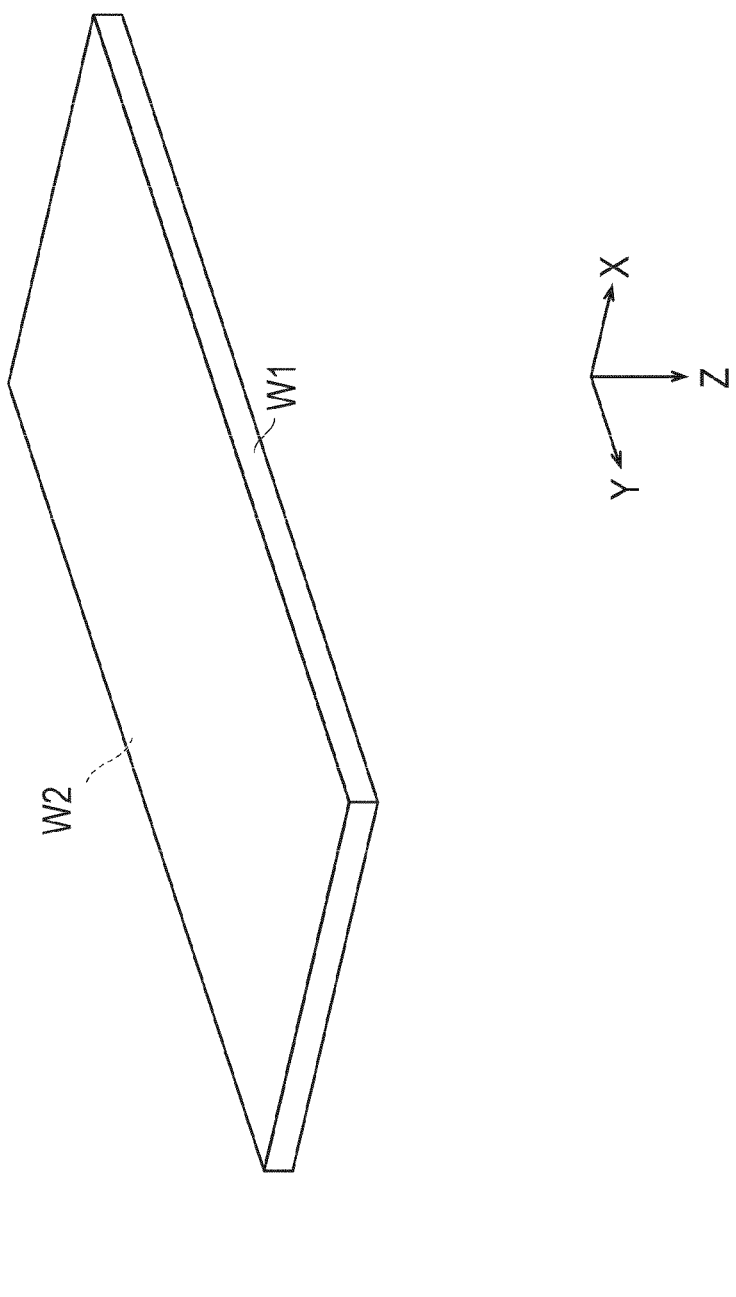
FIG. 3 is a perspective view illustrating a flat plate-shaped workpiece of the brake pedal before press working according to the present embodiment.

FIG. 3 is a perspective view illustrating the flat plate-shaped workpiece W of the brake pedal 4 according to the present embodiment before press working.

First, in an XZ plane (second plane) formed by the X direction and a Z direction, the workpiece W is formed with an extrusion portion P that extrudes downward in the Z direction and also stretches in the Y direction, extension portions E that are connected to both end portions of the extrusion portion P and extend upward in the Z direction, and flange portions T that are connected to both end portions opposite to the end portions of the extension portions E connected to the extrusion portion P and extend away from each other in the X direction (extrusion step).

Figure 4:
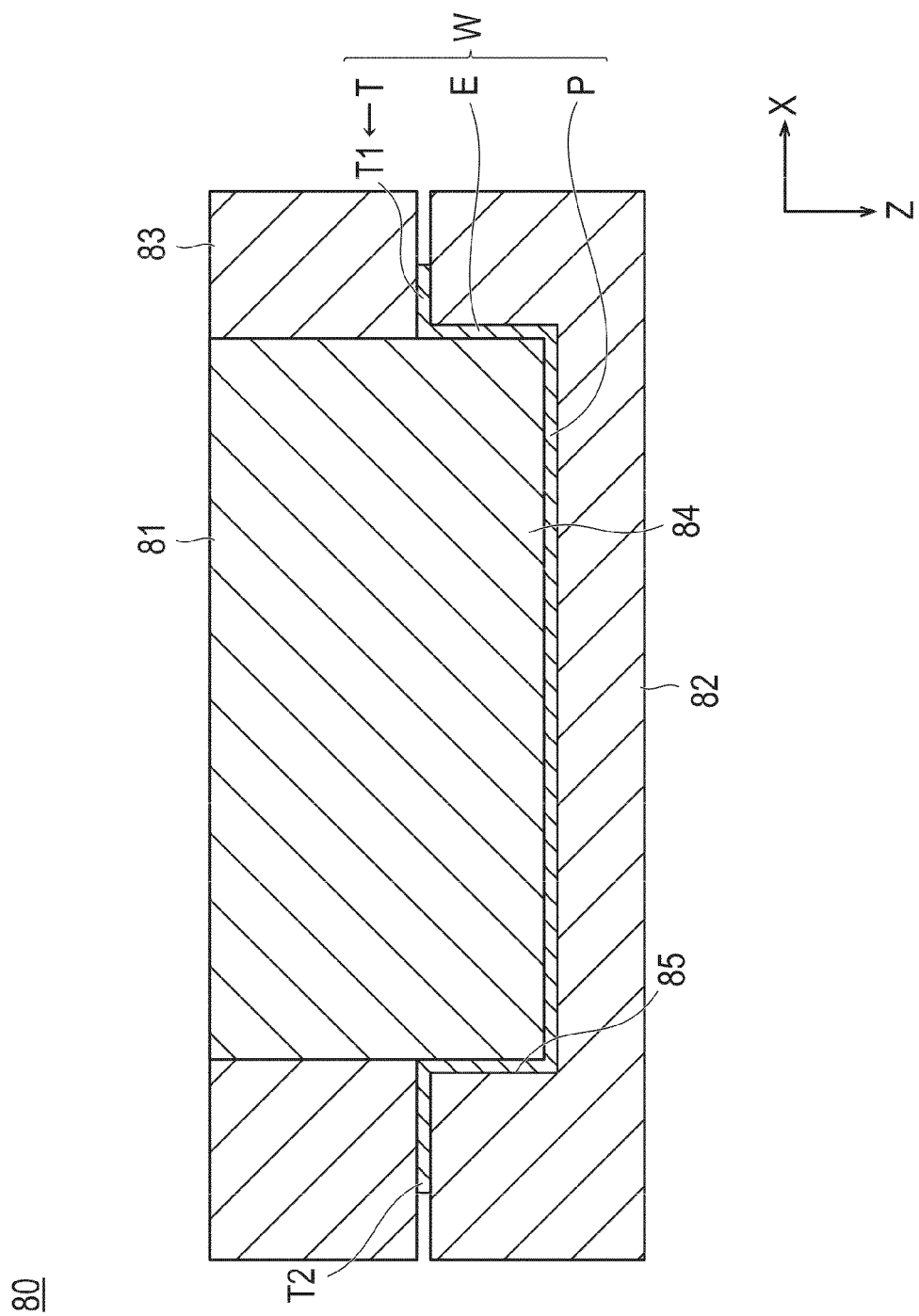
FIG. 4 is a cross-sectional view orthogonal to a Y axis illustrating an extrusion step in a method of manufacturing the brake pedal according to the present embodiment.

FIG. 4 is a cross-sectional view orthogonal to a Y axis illustrating the extrusion step in the method of manufacturing the brake pedal 4 according to the present embodiment.

As illustrated in FIG. 4, the flat plate-shaped workpiece W is formed with the extrusion portion P that extrudes downward in the Z direction by a first forming die 80. The first forming die 80 includes a first upper die 81, a first lower die 82 that is provided to face the first upper die 81, and a blank holder 83. The first upper die 81 includes a convex portion 84 that protrudes toward the first lower die 82. The first lower die 82 includes a groove portion 85 that is recessed to correspond to the convex portion 84 of the first upper die 81. In addition, the blank holder 83 is provided on an outer periphery of the first upper die 81.

In the extrusion step, first, the workpiece W is placed in the first forming die 80, and the first lower die 82 and the blank holder 83 are brought close to each other in a state where the first upper die 81 is separated from the first lower die 82, so that the workpiece W is sandwiched by the first lower die 82 and the blank holder 83. Subsequently, the first upper die 81 is brought close to the first lower die 82. Thus, the workpiece W is formed with the extrusion portion P that extrudes downward in the Z direction and also stretches in the Y direction, the extension portions E that are connected to both end portions of the extrusion portion P and extend upward in the Z direction, and the flange portions T that are connected to both end portions opposite to the end portions of the extension portions E connected to the extrusion portion P and extend away from each other in the X direction. In order to perform a hemming junction in a junction step to be described below, a first flange portion T1 provided on the right side in the X direction is formed to be shorter than a second flange portion T2 provided on the left side in the X direction.

In the extrusion step, since the workpiece W is sandwiched by the first lower die 82 and the blank holder 83, an inflow bias of the workpiece W is suppressed and thus generation of wrinkles or the like can be prevented.

Subsequently, in the XZ plane, a protrusion portion S, which protrudes upward in the Z direction, is formed in the vicinity of the center of the extrusion portion P; and the extrusion portion P, the extension portion E, and the flange portion T are curved upward in the Z direction based on a connection portion C, which connects the protrusion portion S and the extrusion portion P to each other, while maintaining curvature between the extrusion portion P and the extension portion E and curvature between the extension portion E and the flange portion T (protrusion step).

Figure 5:
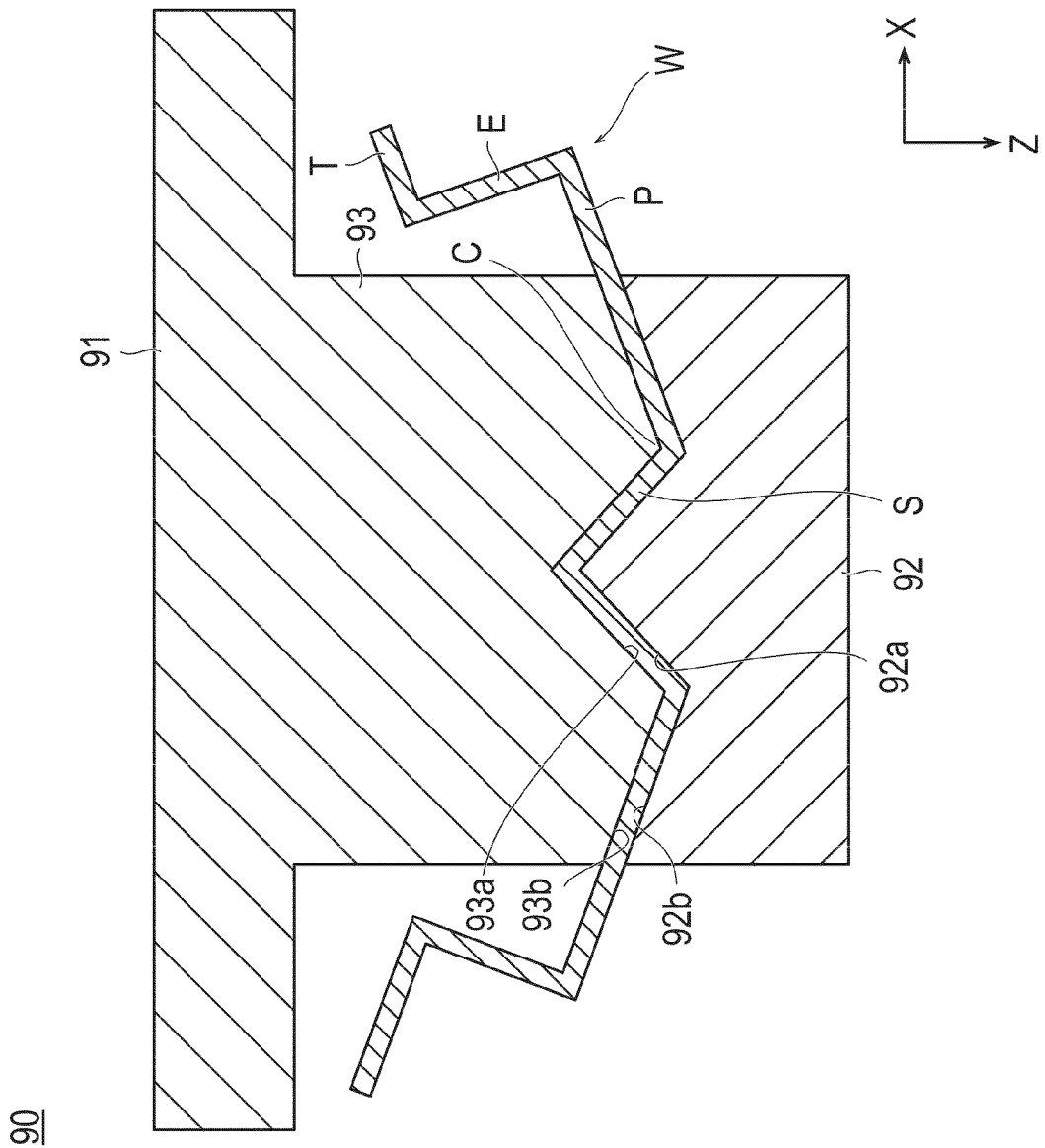
FIG. 5 is a cross-sectional view orthogonal to a Y axis illustrating a protrusion step in the method of manufacturing the brake pedal according to the present embodiment.

FIG. 5 is a cross-sectional view orthogonal to the Y axis illustrating the protrusion step in the method of manufacturing the brake pedal 4 according to the present embodiment.

As illustrated in FIG. 5, the protrusion portion S is formed by a second forming die 90 on the workpiece W formed with the extrusion portion P, the extension portion E, and the flange portion T in the extrusion step. The second forming die 90 includes a second upper die 91 and a second lower die 92 that is provided to face the second upper die 91. The second upper die 91 includes a convex portion 93 that protrudes toward the second lower die 92. A lower surface 93a of the convex portion 93 and an upper surface 92a of the second lower die 92 have a shape corresponding to the protrusion portion S. In addition, the lower surface 93a of the convex portion 93 and the upper surface 92a of the second lower die 92 have inclined portions 93b and 92b provided outside in the X direction and having the shape corresponding to the protrusion portion S, respectively.

In the protrusion step, first, the workpiece W is placed in the second forming die 90, and the second upper die 91 and the second lower die 92 are brought close to each other. Thus, the protrusion portion S, which protrudes upward in the Z direction, is formed in the vicinity of the center of the extrusion portion P in the X direction. In addition, the connection portion C is formed to connect the protrusion portion S and the extrusion portion P to each other by the inclined portions 93b and 92b, and the extrusion portion P, the extension portion E, and the flange portion T are curved upward in the Z direction based on the connection portion C.

Subsequently, in the XZ plane, the extrusion portion P, the extension portion E, and the flange portion T are further curved upward in the Z direction based on the connection portion C, by pressing of the protrusion portion S downward in the Z direction, while maintaining curvature between the protrusion portion S and the extrusion portion P, curvature between the extrusion portion P and the extension portion E, and curvature between the extension portion E and the flange portion T (rough forming step).

Figure 6:
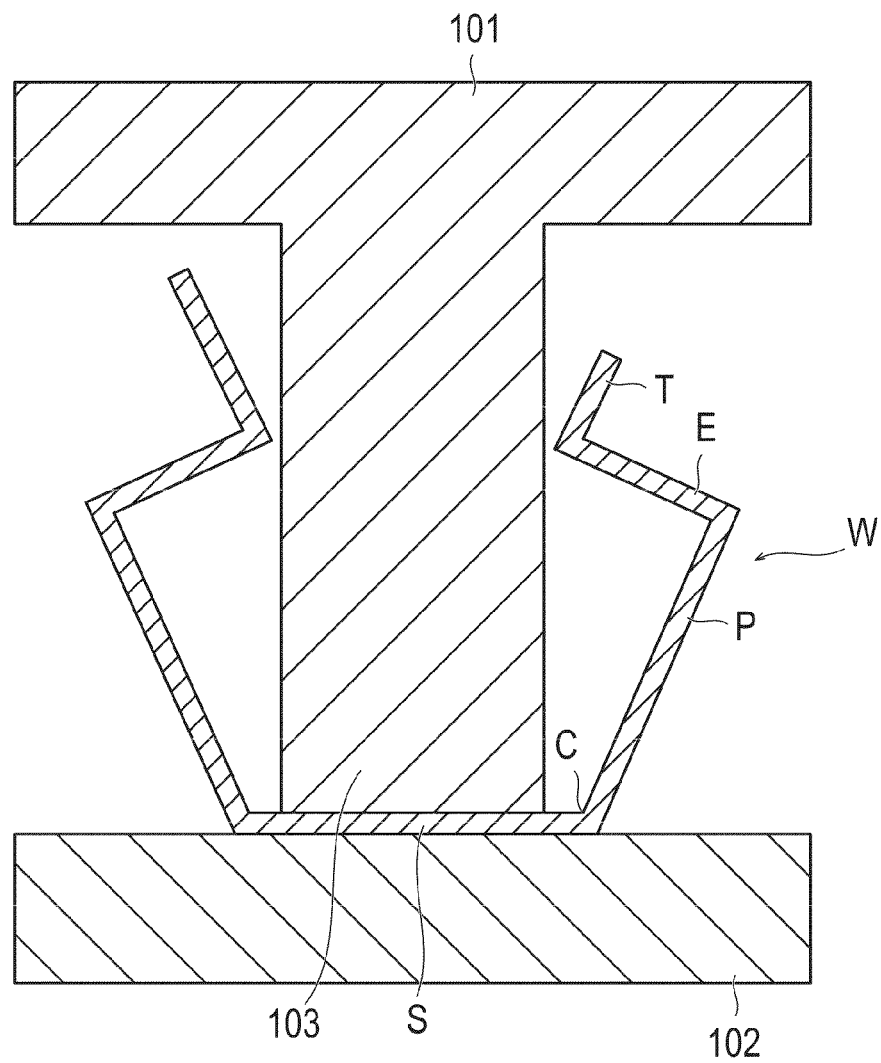
FIG. 6 is a cross-sectional view orthogonal to a Y axis illustrating a rough forming step in the method of manufacturing the brake pedal according to the present embodiment.

FIG. 6 is a cross-sectional view orthogonal to the Y axis illustrating the rough forming step in the method of manufacturing the brake pedal 4 according to the present embodiment.

With respect to the workpiece W in which the protrusion portion S is formed in the protrusion step, as illustrated in FIG. 6, the extrusion portion P, the extension portion E, and the flange portion T are further curved upward in the Z direction based on the connection portion C, by a third forming die 100. The third forming die 100 includes a third upper die 101 and a third lower die 102 that is provided to face the third upper die 101. The third upper die 101 includes a convex portion 103 that protrudes toward the third lower die 102. A lower surface 103a of the convex portion 103 and an upper surface 102a of the third lower die 102 are provided in the X direction in substantially parallel with each other. In addition, the width of the convex portion 103 in the X direction is formed to be narrower than the width between connection portions of the extension portion E and the flange portion T.

In the rough forming step, first, the workpiece W is placed in the third forming die 100 such that the connection portion C comes in contact with the third lower die 102, and the third upper die 101 and the third lower die 102 are brought close to each other. Thus, the protrusion portion S protruding upward in the Z direction in the protrusion step is formed in a planar shape. Then, the extrusion portion P, the extension portion E, and the flange portion T are further curved upward in the Z direction based on the connection portion C, while maintaining curvature between the protrusion portion S and the extrusion portion P, curvature between the extrusion portion P and the extension portion E, and curvature between the extension portion E and the flange portion T.

Subsequently, in the XZ plane, the protrusion portion S swells downward in the Z direction, so that the ridge portion 11 is formed and the flange portions T are brought close to each other (swelling step).

Figure 7:
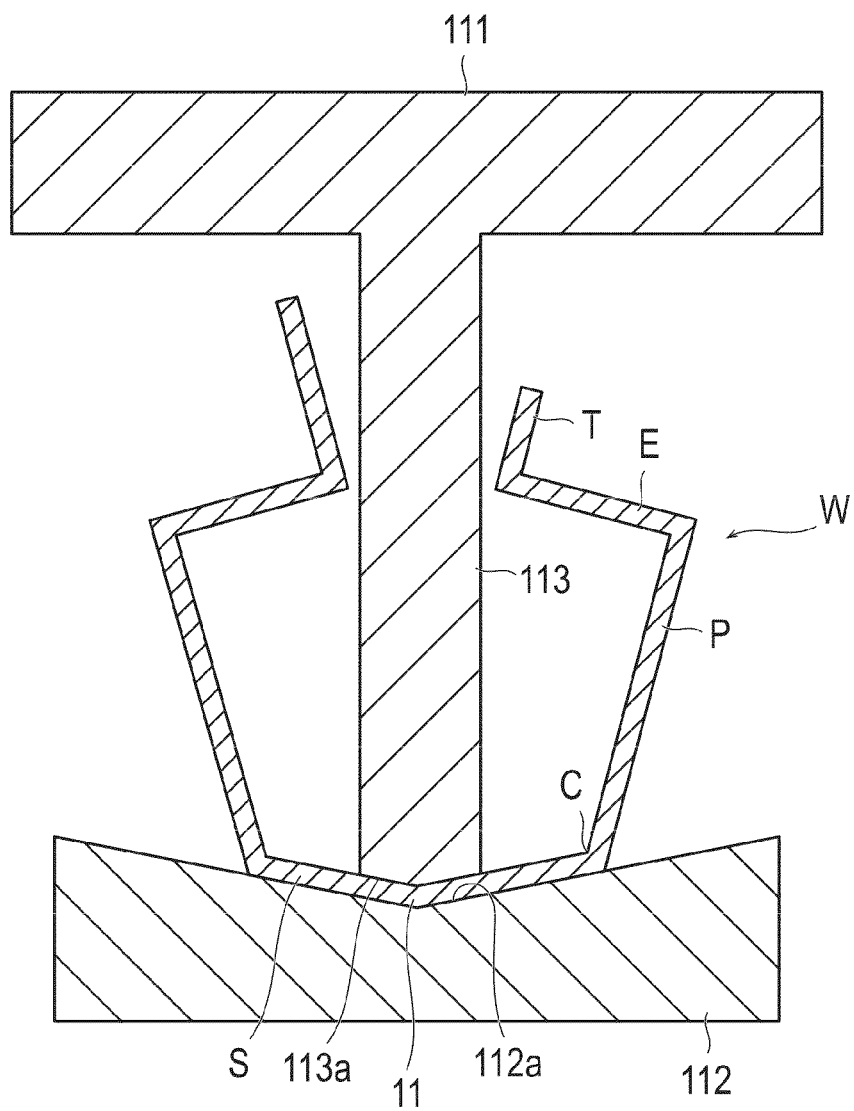
FIG. 7 is a cross-sectional view orthogonal to a Y axis illustrating a swelling step in the method of manufacturing the brake pedal according to the present embodiment.

FIG. 7 is a cross-sectional view orthogonal to the Y axis illustrating the swelling step in the method of manufacturing the brake pedal 4 according to the present embodiment.

With respect to the workpiece W in which the extrusion portion P, the extension portion E, and the flange portion T are further curved upward in the Z direction based on the connection portion C in the rough forming step, as illustrated in FIG. 7, the ridge portion 11 is formed by a fourth forming die 110. The fourth forming die 110 includes a fourth upper die 111 and a fourth lower die 112 that is provided to face the fourth upper die 111. The fourth upper die 111 includes a convex portion 113 that protrudes toward the fourth lower die 112. A lower surface 113a of the convex portion 113 and an upper surface 112a of the fourth lower die 112 have a shape corresponding to the ridge portion 11. In addition, the convex portion 113 is formed to be longer in a pressing direction and to have a narrow width in the X direction, compared to the convex portion 103 of the third forming die 100. The width of the convex portion 113 in the X direction is formed to be narrower than the width between connection portions of the extension portion E and the flange portion T.

In the swelling step, first, the workpiece W is placed in the fourth forming die 110, and the fourth upper die 111 and the fourth lower die 112 are brought close to each other. Thus, the ridge portion 11 is formed on the protrusion portion S, which is formed in the planar shape in the rough forming step, to swell downward in the Z direction. At this time, the flange portions T also come close to each other, while maintaining curvature between the protrusion portion S and the extension portion P, curvature between the extension portion P and the extension portion E, and curvature between the extension portion E and the flange portion T.

Subsequently, in the XZ plane, the extrusion portion P is curved to be substantially parallel with the X direction, while maintaining curvature between the extension portion P and the extension portion E and curvature between the extension portion E and the flange portion T, and thus the flange portions T come in contact with each other (contacting step).

Figure 8:
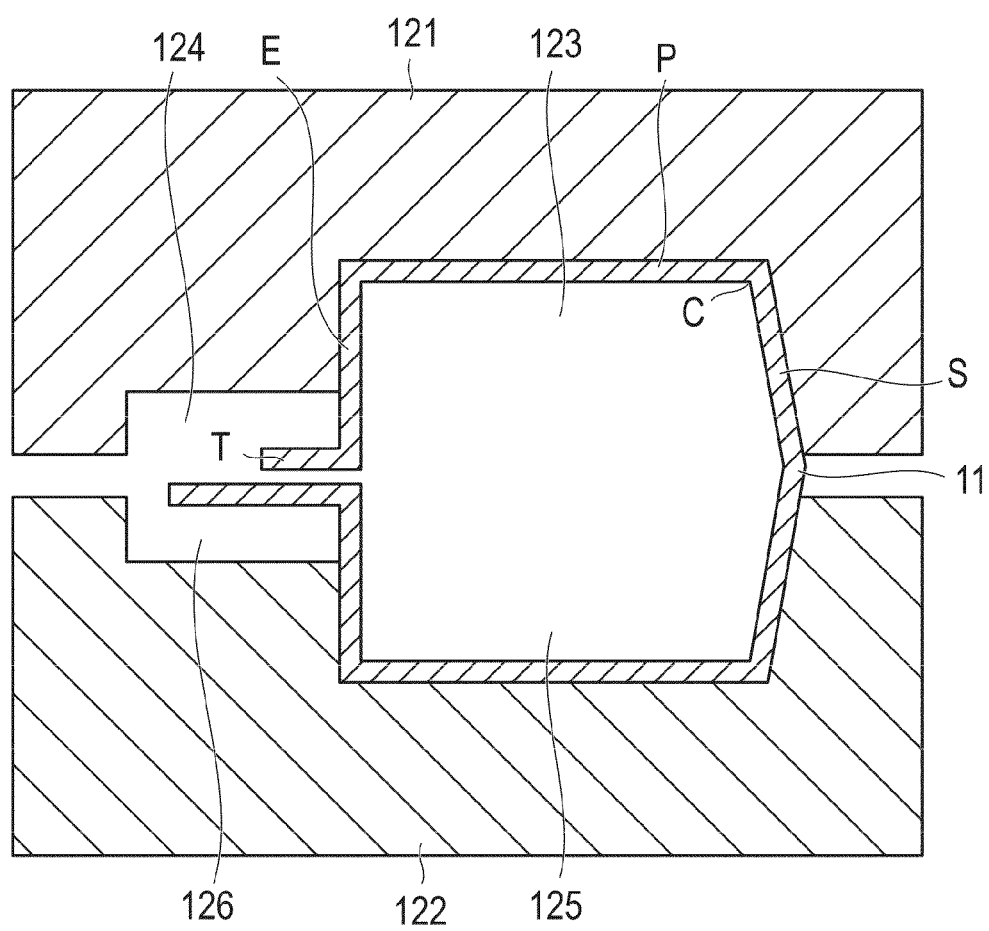
FIG. 8 is a cross-sectional view orthogonal to a Y axis illustrating a contacting step in the method of manufacturing the brake pedal according to the present embodiment.

FIG. 8 is a cross-sectional view orthogonal to the Y axis illustrating the contacting step in the method of manufacturing the brake pedal 4 according to the present embodiment.

As illustrated in FIG. 8, the workpiece W, in which the ridge portion 11 is formed in the swelling step, rotates counterclockwise by 90 degrees, the extrusion portion P is curved to be substantially parallel with the X direction by a fifth forming die 120, and thus the flange portions T come in contact with each other. The fifth forming die 120 includes a fifth upper die 121 and a fifth lower die 122 that is provided to face the fifth upper die 121. The fifth upper die 121 includes a first groove portion 123 that is configured such that the extrusion portion P is curved to be substantially parallel with the X direction and a second groove portion 124 that is configured to avoid interference with the flange portion T. The fifth lower die 122 includes a first groove portion 125 and a second groove portion 126 as in the fifth upper die 121.

In the contacting step, first, the workpiece W rotated counterclockwise by 90 degrees is placed in the fifth forming die 120, and the fifth upper die 121 and the fifth lower die 122 are brought close to each other. Thus, the first groove portion 123 of the fifth upper die 121 presses downward the extrusion portion P in the Z direction, and the first groove portion 125 of the fifth lower die 122 presses upward the extrusion portion P in the Z direction, and the extrusion portion P is curved to be substantially parallel with the X direction. At this time, the flange portions T also come in contact with each other, while maintaining curvature between the extrusion portion P and the extension portion E and curvature between the extension portion E and the flange portion T.

Subsequently, the flange portions T, which have come in contact with each other, are joined to each other by hemming junction (joining step).

Figure 9:
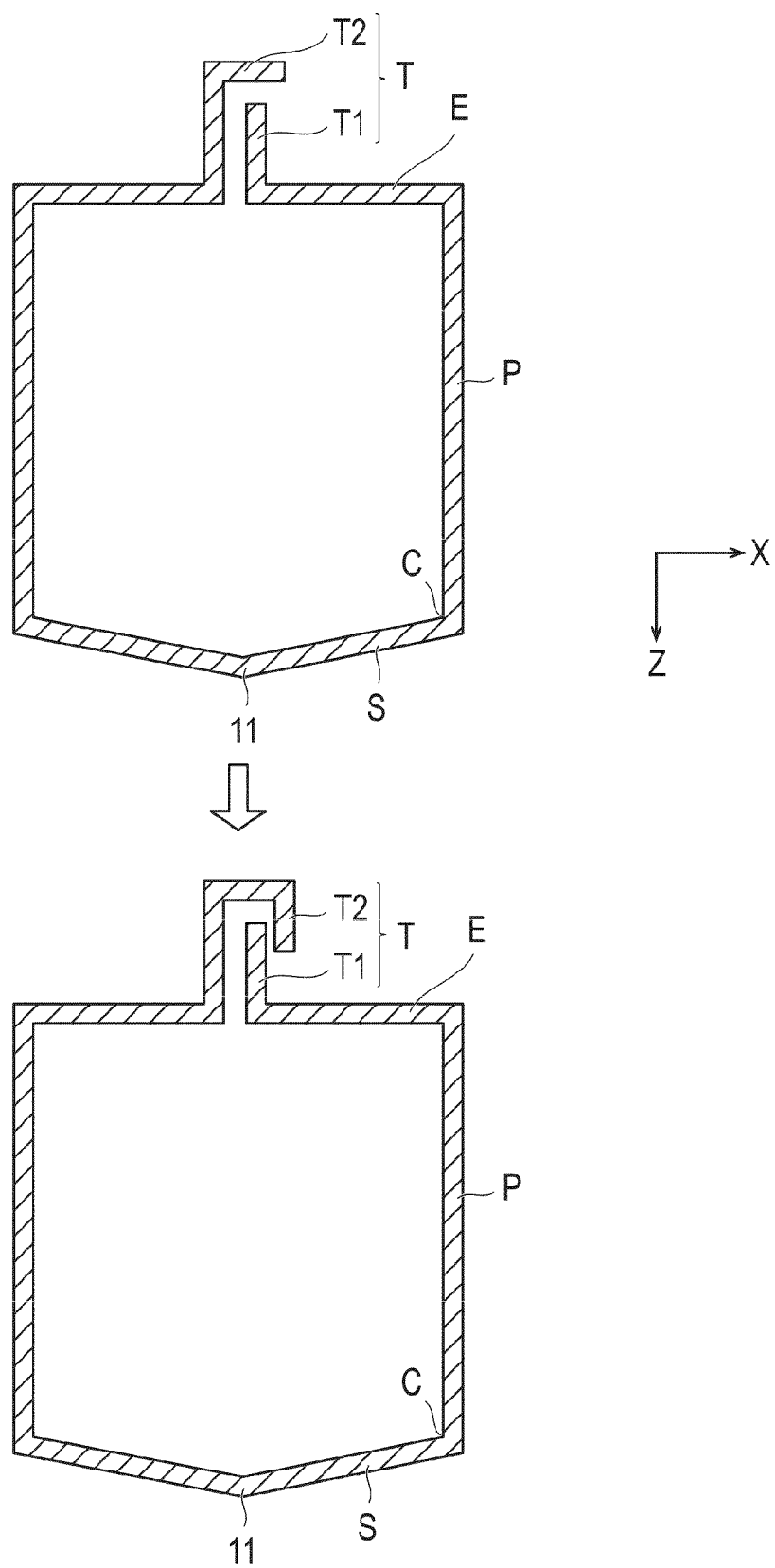
FIG. 9 is a cross-sectional view orthogonal to a Y axis illustrating a joining step in the method of manufacturing the brake pedal according to the present embodiment.

FIG. 9 is a cross-sectional view orthogonal to the Y axis illustrating the joining step in the method of manufacturing the brake pedal according to the present embodiment.

With respect to the workpiece W in which the flange portions T come in contact with each other in the contacting step, as illustrated in FIG. 9, the hemming junction is performed in a stepwise manner in a sixth forming die (not illustrated).

In the joining step, the second flange portion T2 is hemming-joined to the first flange portion T1 so as to cover the first flange portion T1 that is formed shorter than the second flange portion T2.

Subsequently, holes 21 through which the support shaft 3 is inserted are formed coaxially on both sides of the extrusion portion P by flow drilling (hole forming step). The holes 21 may be formed by press working or the like without being limited to the flow drilling.

Figure 10:
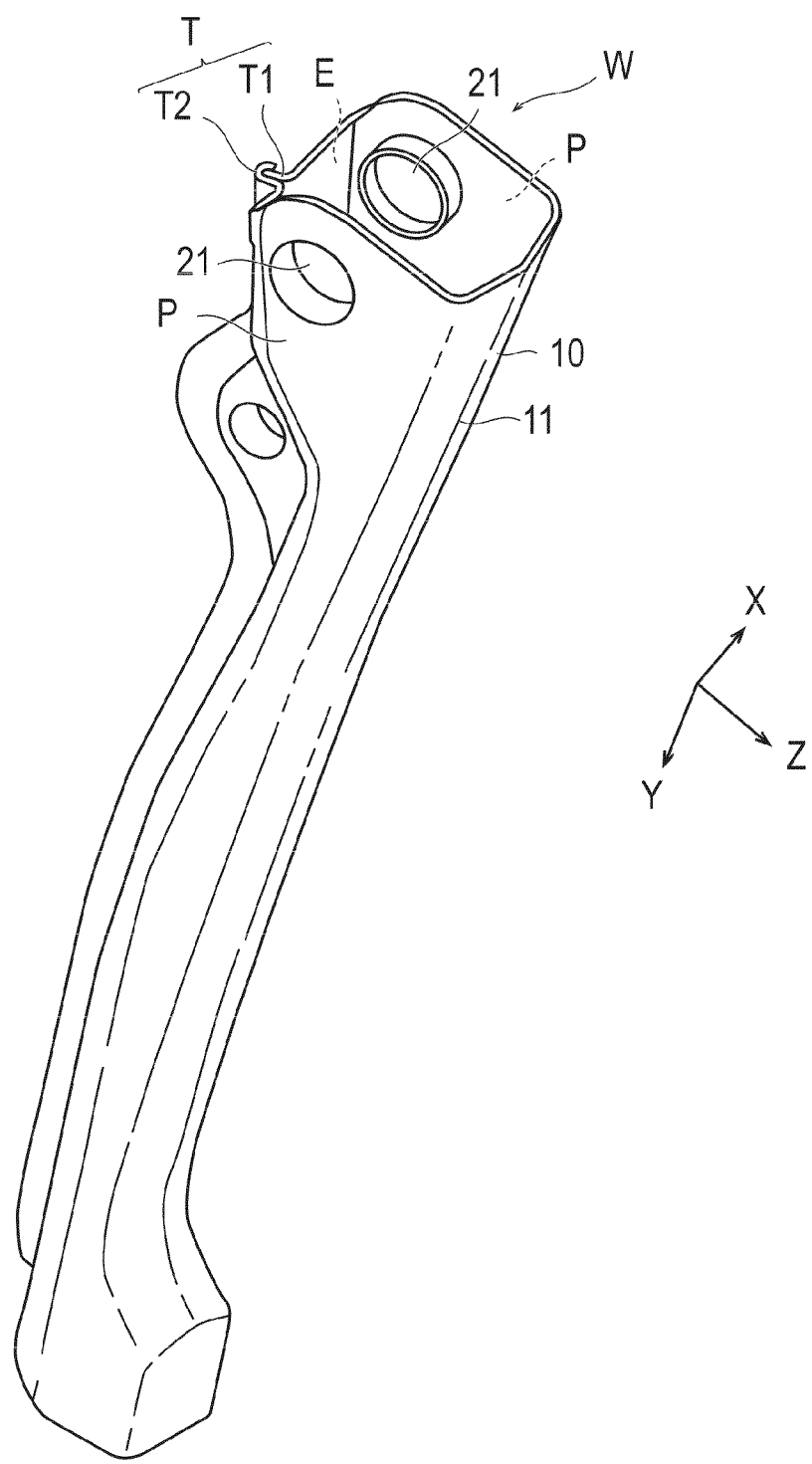
FIG. 10 is a perspective view illustrating a workpiece after completion of a hole forming step.

FIG. 10 is a perspective view illustrating a workpiece W after completion of the hole forming step.

With respect to the workpiece W in which the flange portions T are hemming-joined to each other in the joining step, as illustrated in FIG. 10, the holes 21 through which the support shaft 3 is inserted are formed coaxially on both sides of the extrusion portion P by a flow drilling machine (not illustrated).

Through the above steps, the brake pedal 4 is manufactured.

The extrusion portion P, the extension portion E, the protrusion portion S, and the flange portions T1 and T2 described in the manufacturing method correspond to the pair of second walls 20, the third wall 30, the first wall 10, and the end portions W1 and W2 described in each of the embodiments, respectively.

As described above, the brake pedal 4 according to the present embodiment is formed in such a manner that the end portions W1 and W2 of the flat plate-shaped workpiece W are joined to each other at the joint 31, and is rotatable with respect to the support shaft 3. In addition, the brake pedal 4 includes: the first wall 10 that is the operation surface side on which the rotational force F acts to rotate; the pair of second walls 20 that are provided with the coaxial holes 21, through which the support shaft 3 is inserted, and are bent continuously to both ends of the first wall 10; and the third wall 30 that is provided to face the first wall 10 and is configured to connect the pair of second walls 20 to each other through the joint 31. For this reason, there is no joint 31 on the operation surface side, and it is possible to provide the brake pedal 4 with good operability.

In addition, the brake pedal 4 further includes the ridge portion 11 that is provided to extend in the direction intersecting the support shaft 3 of the first wall 10 and swells along the direction from the third wall 30 to the first wall 10. For this reason, strength is improved against the rotational force F.

Furthermore, the end portions W1 and W2 are joined to each other at the joint 31 by the hemming junction. For this reason, the end portions W1 and W2 of the workpiece W can be easily and reliably joined to each other.

In addition, as described above, the method of manufacturing the brake pedal 4 according to the present embodiment is a method of manufacturing the brake pedal 4 that is formed in such a manner that the flat plate-shaped workpiece W extending in the XY plane formed by the X direction and the Y direction is subjected to the press working in a stepwise manner using the plurality of forming dies, and is manufactured to be rotatable with respect to the support shaft 3. The method of manufacturing the brake pedal 4 according to the present embodiment includes the extrusion step of: on the workpiece W in the XZ plane, forming the extrusion portion P that extrudes downward in the Z direction and also stretches in the Y direction; and forming extension portions E that are connected to both end portions of the extrusion portion P and extend upward in the Z direction and flange portions T that are connected to both end portions opposite to the end portions of the extension portions E connected to the extrusion portion P and extend away from each other in the X direction. The method of manufacturing the brake pedal 4 according to the present embodiment further includes the protrusion step of: in the XZ plane, forming a protrusion portion S, which protrudes upward in the Z direction, in the vicinity of the center of the extrusion portion P; and curving upward the extrusion portion P, the extension portion E, and the flange portion T in the Z direction based on a connection portion C, which connects the protrusion portion S and the extrusion portion P to each other, while maintaining curvature between the extrusion portion P and the extension portion E and curvature between the extension portion E and the flange portion T. The method of manufacturing the brake pedal 4 according to the present embodiment further includes the rough forming step of: in the XZ plane, further curving upward the extrusion portion P, the extension portion E, and the flange portion T in the Z direction based on the connection portion C, by pressing the protrusion portion S downward in the Z direction, while maintaining the curvature between the protrusion portion S and the extrusion portion P, the curvature between the extrusion portion P and the extension portion E, and the curvature between the extension portion E and the flange portion T. The method of manufacturing the brake pedal 4 according to the present embodiment further includes the contacting step of: in the XZ plane, curving the extrusion portion P to be substantially parallel with the Z direction, while maintaining the curvature between the extrusion portion P and the extension portion E and the curvature between the extension portion E and the flange portion T, thereby contacting the flange portions T with each other and the joining step of joining the flange portions T to each other by the hemming junction. The method of manufacturing the brake pedal 4 according to the present embodiment further includes the hole forming step of coaxially forming the holes 21 through which the support shaft 3 is inserted on both sides of the extrusion portion P by the flow drilling. For this reason, the protrusion portion S serves as the operation surface side on which the rotational force F acts, and thus there is no joint 31 on the operation surface side. Therefore, it is possible to provide the method of manufacturing the brake pedal 4 that can be easily manufactured with good operability.

In addition, the manufacturing method further includes the swelling step of: in the XZ plane, swelling downward the protrusion portion S in the Z direction to form the ridge portion 11 and bring the flange portions T close to each other, between the rough forming step and the contacting step. Thus, the strength is improved against the rotational force F.

Furthermore, in the joining step, the flange portions T are joined to each other by the hemming junction. For this reason, the flange portions T of the workpiece W can be easily and reliably joined to each other.

It should be noted that the present invention is not limited to the embodiment describe above, and can be modified in various manners within the scope of the claims.

For example, the flange portions T are joined to each other by the hemming junction in the joining step, but may be joined to each other by welding junction. According to this configuration, it is possible to provide the brake pedal 4 having higher strength.

In addition, the brake pedal 4 is used in the present embodiment, but a long arm-shaped vehicle part such as a clutch pedal arm is also similarly applicable.

REFERENCE SIGNS LIST

10: First wall
11: Ridge portion
20: Pair of second walls
21: Hole
3: Support shaft
30: Third wall
31: Joint
4: Brake pedal
80, 90, 100, 110, 120: Forming die
C: Connection portion
E: Extension portion
F: Rotational force
P: Extrusion portion
S: Protrusion portion
T, T1, T2: Flange portion
W: Workpiece
W1, W2: End portion

The invention claimed is:

1. A method of manufacturing a hollow operating lever that is formed in such a manner that a flat plate-shaped workpiece extending in a first plane formed by a first direction and a second direction orthogonal to the first direction is subjected to the press working in a stepwise manner using a plurality of forming dies and is manufactured to be rotatable with respect to a support shaft, comprising:

an extrusion step of: on the workpiece in a second plane formed by the first direction and a third direction, forming an extrusion portion that extrudes along the third direction and also stretches in the second direction; and forming extension portions that are connected to both end portions of the extrusion portion and extend in a direction opposite to an extruding direction of the extrusion portion and flange portions that are connected to both end portions opposite to the end portions of the extension portions connected to the extrusion portion and extend away from each other in the first direction;

a protrusion step of: in the second plane, forming a protrusion portion which protrudes in the direction opposite to the extruding direction of the extrusion portion in the vicinity of the center of the extrusion portion; and curving the extrusion portion, the extension portion, and the flange portion in the direction opposite to the extruding direction of the extrusion portion, based on a connection portion, which connects the protrusion portion and the extrusion portion to each other, while maintaining curvature between the extrusion portion and the extension portion and curvature between the extension portion and the flange portion;

a rough forming step of: in the second plane, further curving the extrusion portion, the extension portion, and the flange portion in the direction opposite to the extruding direction of the extrusion portion based on the connection portion, by pressing of the protrusion portion in the extruding direction of the extrusion portion, while maintaining curvature between the protrusion portion and the extrusion portion, curvature between the extrusion portion and the extension portion, and curvature between the extension portion and the flange portion;

a contacting step of: in the second plane, curving the extrusion portion to be substantially parallel with the extruding direction of the extrusion portion, while maintaining the curvature between the extrusion portion and the extension portion and the curvature between the extension portion and the flange portion, thereby contacting the flange portions with each other;

a joining step of joining the flange portions to each other; and a hole forming step of coaxially forming the holes through which the support shaft is inserted on both sides of the extrusion portion.

2. The method of manufacturing the hollow operating lever according to claim 1, further including: a swelling step of; in the second plane, swelling the protrusion portion in the extruding direction of the extrusion portion to form a ridge portion and bring the flange portions close to each other, between the rough forming step and the contacting step.

3. The method of manufacturing the hollow operating lever according to claim 1, wherein the flange portions are joined to each other by hemming junction or welding junction in the joining step.

* * * * *